(12) United States Patent
Sanderson

(10) Patent No.: US 9,392,737 B2
(45) Date of Patent: Jul. 19, 2016

(54) WAVY DISC BLADE WITH NOTCHES

(71) Applicant: North American Tillage Tools Company, Hamilton (CA)

(72) Inventor: Donald Joseph Sanderson, Puslinch (CA)

(73) Assignee: NATT TOLLS GROUP INC., Hamilton, Ontario (CA)

(*) Notice: Subject to any disclaimer, the term of this patent is extended or adjusted under 35 U.S.C. 154(b) by 0 days.

(21) Appl. No.: 14/435,393

(22) PCT Filed: Jul. 25, 2014

(86) PCT No.: PCT/CA2014/000581
§ 371 (c)(1),
(2) Date: Apr. 13, 2015

(87) PCT Pub. No.: WO2015/010184
PCT Pub. Date: Jan. 29, 2015

(65) Prior Publication Data
US 2015/0289433 A1      Oct. 15, 2015

Related U.S. Application Data

(60) Provisional application No. 61/859,017, filed on Jul. 26, 2013.

(51) Int. Cl.
*A01B 15/18*      (2006.01)
*A01B 7/00*       (2006.01)
(Continued)

(52) U.S. Cl.
CPC . *A01B 7/00* (2013.01); *A01B 15/16* (2013.01); *A01B 23/06* (2013.01)

(58) Field of Classification Search
CPC .......... A01B 7/00; A01B 15/16; A01B 15/18; A01B 23/06; A01B 35/28; A01C 5/064
USPC ............................ 111/169; 172/555, 604, 765
See application file for complete search history.

(56) References Cited

U.S. PATENT DOCUMENTS 1,931,960 A    10/1933  Johnson
2,575,321 A *  11/1951  Traver .................... A01B 23/00
                                                         172/555

(Continued)

FOREIGN PATENT DOCUMENTS

CA           2698858 A1    9/2011

OTHER PUBLICATIONS

International Search Report and Written Opinion for PCT/CA2014/000581, dated Oct. 7, 2014.

(Continued)

*Primary Examiner* — Robert Pezzuto
(74) *Attorney, Agent, or Firm* — Levenfeld Pearlstein, LLC

(57) ABSTRACT

A wavy disc blade is provided. The wavy disc blade includes a first side, a second side, a central portion having at least one opening, and a wavy portion adjacent to, extending radially from and circumferentially about the central portion. The wavy portion includes a plurality of waves extending from the central portion to an edge portion, the waves forming a plurality of crests and valleys between the central portion and the edge portion. The wavy disc blade also includes a plurality of teeth formed along the edge portion. At least one of a first beveled portion may be formed on the first side at and along the edge portion and a second beveled portion may be formed on the second side at and along the edge portion.

20 Claims, 6 Drawing Sheets

(51) Int. Cl.
*A01B 23/06* (2006.01)
*A01B 15/16* (2006.01)

(56) References Cited

U.S. PATENT DOCUMENTS

| | | | |
|---|---|---|---|
| 3,621,922 A | 11/1971 | Hinken | |
| 4,538,688 A | 9/1985 | Szues et al. | |
| 5,623,997 A | 4/1997 | Rawson et al. | |
| 5,649,602 A | 7/1997 | Bruce | |
| 6,554,079 B2* | 4/2003 | Bruce | A01B 23/06 111/169 |
| 7,143,838 B2 | 12/2006 | Piccat | |
| 7,497,270 B2* | 3/2009 | Bruce | A01B 23/06 172/604 |
| 7,874,376 B2 | 1/2011 | Piccat | |
| 7,992,651 B2 | 8/2011 | Bruce | |
| 8,074,728 B2 | 12/2011 | Kovach et al. | |
| D718,345 S * | 11/2014 | Whalen | D15/11 |
| 9,027,664 B2* | 5/2015 | Bruce | B24B 3/466 172/604 |
| 2002/0038620 A1* | 4/2002 | Gentilhomme | A01B 23/06 111/166 |

OTHER PUBLICATIONS

Photographs of STROM-Bednar "A-Discs" taken at SIMA Paris International Agri Business Show in Paris, France, dated Feb. 24, 2013.

* cited by examiner

WAVY DISC BLADE WITH NOTCHES

BACKGROUND OF THE INVENTION

The present invention relates generally to agricultural equipment, and more particularly to a disc blade for tilling soil. The disc blade of the present invention may be used with harrows or similar equipment and is suitable, for example, in vertical tillage applications.

Disc blades have been used in the agricultural industry to work soil, i.e., leveling, breaking up, burying residue, etc. Disc blades may typically be attached to, or operate as part of, devices such as a harrow or similar agricultural implements. The disc blades are pulled through the soil while being caused to rotate. The rotating blade engages the soil as it passes through the soil, thereby working the soil. This may be done, for example, in preparation for planting and/or for seasonal soil maintenance.

Prior art disc blades have been made in numerous configurations. However, nearly all such prior art blades typically have a generally round (disc-like) shape with either a generally flat or a generally concave central portion configured with a hole or other opening, or openings, configured to mount the blade to a harrow or similar agricultural implement. Many of the other features of such blades can vary depending on the nature of the particular tilling application and the characteristics of the soil being tilled, such as the hardness of the soil, the presence of rocks or other content, and/or the presence of certain types of agricultural residue.

For example, some prior art blades have a generally smooth surface. However, other blades have been formed with surface deformations, such as flutes, ridges, grooves, scallops, waves and the like that are designed to cut and move the soil in a manner that results in the desired soil condition.

Similarly, some other prior art disc blades include a generally circular edge (or perimeter or periphery), while other disc blades incorporate various edge geometries and/or deformations, such as notches, grooves, bevels, teeth, saw-teeth and like structures that are adapted to address various types of soils and tilling conditions.

Prior art disc blades have been made in various diameters, ranging from diameters of about 8 inches to diameters of about 36 inches, depending on the geometry and configuration of the particular blade, the nature of the particular tilling application and the characteristics of the soil being tilled. Similarly, prior art disc blades have been made either as flat disc blades (having essentially zero concavity), shallow concavity blades (having radii of curvature in the range of about 850-1000 mm) or as high concavity disc blades (having radii of curvature in the range of about 600-750 mm). In this context, the radius of curvature of the disc blade refers to degree of curvature of the curved portion of the disc blade.

One particular disc blade that has been developed in the art is a disc blade with a radially toothed cutting edge or outer periphery, i.e., the edge comprises teeth having a generally radially sinusoidal, or wavy, geometry. This prior art disc blade includes a generally circular plate having a peripheral radially toothed cutting edge, a smooth (i.e., non-fluted, non-wavy) central portion configured to mountingly engage a harrow or like agricultural implement, and a wavy (or fluted) portion having a plurality of waves or flutes formed by a plurality of adjacent crests and valleys disposed between the smooth central portion and the radially toothed edge.

In this particular prior art disc blade, the plurality of crests, as viewed from one side of the disc blade, extend radially from the central portion of the disc blade at a distance that is further than the distance that the plurality of valleys. In this manner, a radially toothed cutting edge is formed along the outer periphery of the blade. The geometry of this radially toothed edge may provide for improved soil and residue cutting performance while at the same time providing the disc blade with the ability to self-sharpen with ongoing use. The toothed cutting edge includes a plurality of teeth that are symmetrically formed.

That is, as the disc blade wears with use, and the diameter of the disc blade decreases, the structure of the disc blade provides that the crests and valleys will wear generally evenly, maintaining the radially toothed profile of the outer periphery of the disc blade instead of wearing unevenly and creating a generally smooth outer periphery over a period of extended use. Thus, with wear, the edge of the disc blade will generally maintain its radially toothed profile instead of becoming smooth (non-toothed), as has been the case with other prior art disc blade designs.

In the traditional disc blades, the number and depth the of waves (i.e., the crests and valleys) may vary depending on the diameter of the disc blade, the nature of the particular tilling application and the characteristics of the soil being tilled (such as the hardness of the soil, the presence of rocks or other content, and/or the presence of certain types of agricultural residue). For example, a common 20 inch blade may have 32 waves formed by the plurality of adjacent crests and valleys, and each wave may have a depth of between 6 and 9 mm (this distance from the top of one crest to the bottom of an adjacent valley). However, numerous variations in the number of waves and their depth are possible.

Traditionally, tilling has been accomplished using horizontal tillage methods and apparatuses as are well known to those skilled in the art. In recent years, however, the agricultural industry has embraced a relatively new type of tilling known as vertical tillage. Vertical tillage involves the use of disc blades configured in a generally vertical orientation relative to the soil. That is, the blades are mounted such that the edge or outer periphery of the blade is perpendicular or transverse to the horizontal plane of the soil, such that the disc blades may cut vertically into the soil. Those skilled in the art are well versed in the advantages of vertical tillage over horizontal tillage, however, one of the major advantages of vertical tillage is the ability to cut, size and bury residue.

Because vertical tillage applications involve relatively high speed and relatively shallow depth use of disc blade, as compared to horizontal tillage applications, prior art disc blades designed for use in prior art horizontal tillage applications are not suitable for use in vertical tillage systems. That is, many such prior art disc blade designs would create undesirable side effects if used in vertical tillage applications, such as unacceptable soil throw. Additionally, many prior art disc blade designs do not have a sufficiently sharp edge for cutting, sizing and burying residue. Further still, symmetrically formed teeth formed along an edge of the disc blade may provide an inadequate tilling function.

What is needed, therefore, is a new disc blade that is particularly suitable for use in vertical tillage applications. Preferably, such a disc blade comprises a wavy disc blade with a radially toothed edge or outer periphery configured to improved cutting, sizing and burying of residue. The present invention satisfies this need.

BRIEF SUMMARY OF THE INVENTION

According to an exemplary embodiment of the present invention, there is provided a wavy disc blade having a first side, a second side, a central portion having at least one opening formed therein, and a wavy portion adjacent to, extending radially from and circumferentially about the central portion. The wavy portion includes a plurality of waves extending from the central portion to an edge portion, the waves forming a plurality of crests and valleys between the central portion and the edge portion. The disc blade further includes a plurality of cutting teeth formed along the edge portion, each tooth of the plurality cutting teeth having a first engagement surface and a second engagement surface, the first engagement surface being shorter than the second engagement surface so that each tooth is asymmetrically shaped. At least one of a first beveled portion may be formed on the first side at and along the edge portion and a second beveled portion may be formed on the second side at and along the edge portion.

According to another general exemplary embodiment of the present invention, there is provided a wavy disc blade having a first side, a second side and a generally circular central portion having at least one opening formed therein. The disc blade also includes a wavy portion adjacent to, extending radially from and circumferentially about the central portion, the wavy portion having a plurality of waves extending from the central portion to an edge portion, the waves forming a plurality of crests and valleys between the central portion and the edge portion. A plurality of teeth and a plurality of notches are formed along the edge portion. Notches of the plurality of notches are alternately positioned between teeth of the plurality of teeth, and each notch of the plurality of notches has one of a first beveled portion formed on the first side of the disc blade or a second beveled portion formed on the second side of the disc blade.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
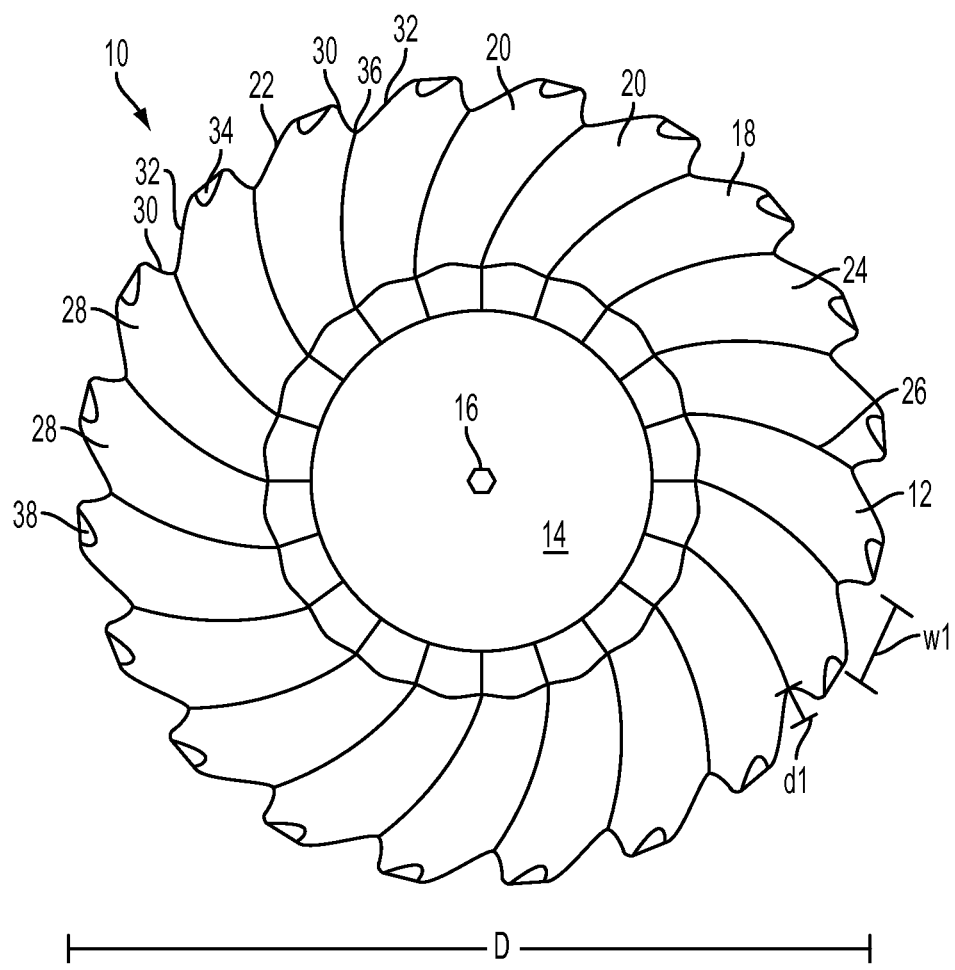
FIG. 1 is a front view showing a first side of a wavy disc blade according to an exemplary embodiment of the present invention.

While the present invention may be embodied in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description of the Invention," relates to a requirement of the United States Patent Office, and does not imply, nor should be inferred to limit the subject matter disclosed herein.

FIG. 1 illustrates a first side of wavy disc blade in accordance with an exemplary embodiment of the present invention. With reference to FIG. 1, the wavy disc blade is shown generally at 10 and includes a first side 12. The first side 12 generally faces in a first axial direction. The wavy disc blade 10 also includes a central portion 14. In one embodiment, the central portion 14 is generally circular. However, it is understood that the present description is not limited to this configuration. Additionally, the central portion 14 may be substantially planar, or alternatively, may be concave or convex.

The central portion 14 has at least one opening 16 formed therein. In an exemplary embodiment, the at least one opening 16 is a single opening positioned at or near a center of the central portion 14. The disc blade 10 is configured rotate on a rotation axis extending through the single opening. The rotation axis extends in the first axial direction and a second axial direction opposite to the first axial direction. Alternatively, the at least one opening 16 may include a plurality of openings positioned about the center of the central portion 14 through which the rotation axis extends. The at least one opening 16 is configured to receive a fastener or fasteners (not shown), a shaft, or an axle so as to rotatably secure the wavy disc blade 10 to an agricultural implement, such as a harrow (not shown). The at least one opening 16 may be non-circular in shape.

The wavy disc blade 10 further includes a wavy portion 18. The wavy portion 18 is positioned adjacent to the central portion 14 and extends circumferentially around, and radially outward therefrom. The wavy portion 18 includes a plurality of waves 20 (or flutes or scallops) extending from the central portion 14 to an edge portion 22 of the disc blade 10. The edge portion 22 is formed at an outer radial edge of the disc blade 10. The plurality of waves 20 forms a plurality of crests 24 and a corresponding plurality of valleys 26. The crests 24 and valleys 26 are alternately positioned in a circumferential direction about the disc blade 10 and extend between the central portion 14 and the edge portion 22. In an exemplary embodiment, the plurality of waves 20 may be curved in a circumferential direction as they extend radially outward from the central portion 14. Additionally, the wavy portion 18 may be substantially planar, or alternatively, may be concave or convex. In an exemplary embodiment, the disc blade 10 may have a diameter D of, for example, 16 inches to 24 inches, but is not limited thereto.

Figure 4:
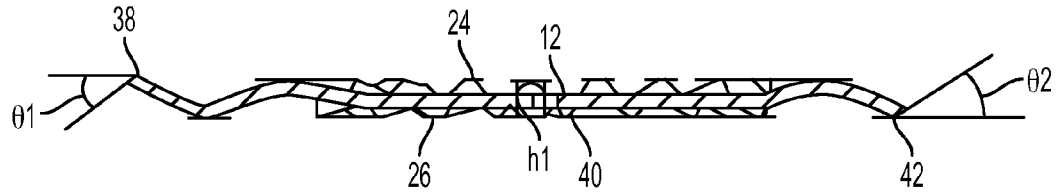
FIG. 4 is a cross-sectional view of the wavy disc blade according to an exemplary embodiment of the present invention.

In an exemplary embodiment, the crests 24 project outward relative to the first side 12 of the central portion 14 generally in the first axial direction, while the valleys 26 do not extend beyond the first side 12 of the central portion 14 (see FIG. 4). It is understood, however, the present invention is not limited to this example, and other configurations are envisioned. For example, the crests 24 may project only to, or short of, the first side 12 at the central portion 14.

A plurality of cutting teeth 28 are formed along the edge portion 22. Each tooth 28 of the plurality of cutting teeth includes a first engagement surface 30 and a second engagement surface 32 positioned circumferentially relative to first engagement surface 30 along the edge portion 22. In an exemplary embodiment, the first engagement surface 30 is shorter than the second engagement surface 32. As a result, each tooth 28 is asymmetrically formed.

The first engagement surface 30 may be a linear or curved segment. Similarly, the second engagement surface 32 may also be a linear or curved segment. The first engagement surface 30 and second engagement surface 32 may intersect to form a peak on each tooth 28. The peak of a tooth 28 may be, for example, a point of the tooth 28 that is radially positioned farthest from the center point or rotation axis. In one embodiment, one of the first engagement surface 30 and the second engagement surface 32 is configured to be a leading edge, in use, for engaging and penetrating a surface to be tilled, while the other of the first engagement surface 30 and the second engagement surface 32 is configured to be a trailing edge.

In an exemplary embodiment, each tooth 28 of the plurality of cutting teeth 28 may include a third engagement surface 34 positioned between the first engagement surface 30 and second engagement surface 32. In addition, in an exemplary embodiment, peaks of the respective teeth 28 may be positioned at a point along the third engagement surface 34. Alternatively, the peaks may be positioned at an intersection the first engagement surface 30 and third engagement surface 34 or an intersection of the second engagement surface 32 and third engagement surface 34. The third engagement surface 34 may also be formed as a curved or linear segment.

In an exemplary embodiment, the first engagement surface 30, second engagement surface 32 and third engagement surface 34 extend continuously to form a profile of each tooth 28. The plurality of teeth 28 form a profile of the edge portion 22. In addition, each tooth 28 may include more than one peak.

With further reference to FIG. 1, a notch 36 is formed between adjacent teeth 28 of the plurality of cutting teeth. Thus, a plurality of notches 36 are formed about a periphery of the disc blade 10, with the notches 36 being alternately positioned with the teeth 28. In one embodiment, each notch 36 is bound by a second engagement surface 32 of one tooth 28 and a first engagement surface 30 of a tooth 28 adjacent to the one tooth 28. In an exemplary embodiment, a notch 36 may have width w1 of, for example, 60 mm to 64 mm. In addition, a notch 36 may have a depth d1 of between 15 mm to 25 mm, and in one embodiment, approximately 19 mm. It is understood, however, that these dimensions are provided as examples, and the present invention is not limited to these dimensions. Further, in an exemplary embodiment, the disc blade 10 may include twenty notches 36, but is not limited thereto.

The individual teeth of the plurality of cutting teeth 28 may also include a first beveled portion 38. The first beveled portion 38 represents a section of reduced thickness of the teeth 28. In an exemplary embodiment, the thickness of a tooth reduces gradually when moving generally radially outward. The first beveled portion 38 may be angled relative to a plane in which the crests 24 of the waves lie. In one embodiment, the first beveled portion 38 is angled between an angle $\theta 1$ of, for example, 5 degrees to 30 degrees, as shown in FIG. 4, and in one embodiment, 10 degrees. Alternatively, the angle $\theta 1$ may be formed at 15 degrees. However, the present invention is not limited to this particular configuration. Additionally, in one embodiment, the first beveled portion 38 extends from a portion of the tooth 28 to the edge portion 22 at the third engagement surface 34.

Figure 2:
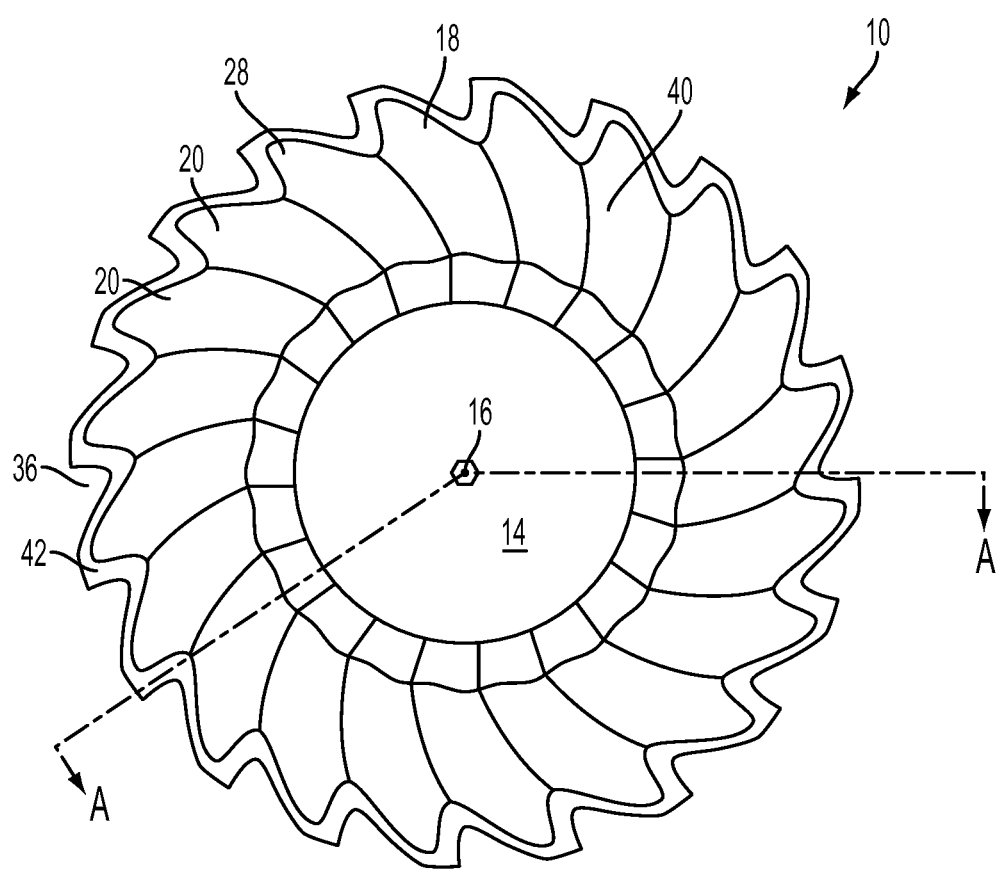
FIG. 2 is a rear view showing a second side of the wavy disc blade according to an exemplary embodiment of the present invention.

FIG. 2 illustrates a second side 40, i.e., a rear view, of the wavy disc blade 10 according to an exemplary embodiment of the present invention. The second side 40 faces the second axial direction, opposite to the first axial direction and is positioned on a side of the disc blade 10 opposite to the first side 12. A thickness of the disc blade 10 is formed between the first side 12 and the second side 40.

The wavy portion 18 extends along the second side 40. In an exemplary embodiment, the plurality of valleys 26 of the waves 20 may extend beyond the central portion 14 at the second side 40 generally in the second axial direction. However, it is understood that this configuration is only one example, and the present description is not limited thereto. For example, the valleys 26 may extend only to the same extent of the central portion 14 at the second side 40, or to a lesser extent than the central portion 14 at the second side 14.

As an alternative, or in addition, to the first side 12 having a first beveled portion 38, the second side 40 may further include a second beveled portion 42 extending at the edge portion 22. In an exemplary embodiment, the second beveled portion 42 is formed continuously about the periphery of the disc blade 10 on the second side 40. It is understood, however, that in some embodiments, the second bevel 42 may be formed discontinuously, or only along discrete segments of the edge portion 22. The second beveled portion 42 represents an area of decreased or decreasing thickness of the disc blade 10 along the teeth 28 and notches 36. The second beveled portion 42 may extend at an angle $\theta 2$ between, for example, 5 degrees to 30 degrees, and in one embodiment 20 degrees, relative to a plane in which the valleys 26 of the waves lie (see FIG. 4). It is understood, however, that the present invention is not limited to this configuration.

Figure 3:
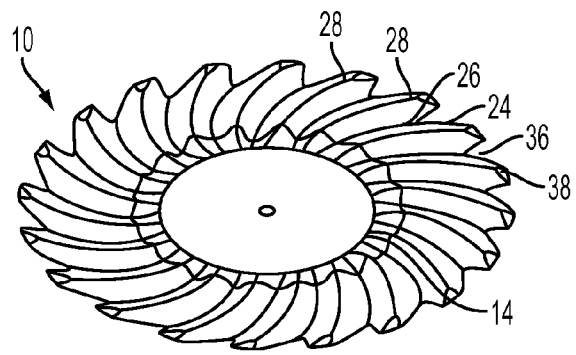
FIG. 3 is a front perspective view showing a first side of the wavy disc blade according to an exemplary embodiment of the present invention.

FIG. 3 illustrates a perspective view showing the first side 12 of the wavy disc blade 10 according to an exemplary embodiment of the present invention. Referring to FIG. 3, on the first side 12, the crests 24 extend generally from the central portion 14 to distal ends of respective teeth 28. The valleys 26, positioned alternately with the crests 24, extend from the central portion 14 to respective notches 36.

FIG. 4 illustrates a cross-sectional view of the wavy disc blade 10 according to an exemplary embodiment of the present invention. The cross-section is taken at A-A shown in FIG. 2. In an exemplary embodiment, the central portion 14 may be substantially planar. That is, the first side 12 and second side 40, in the area of the central portion 14 may each lie in separate, parallel planes spaced apart axially (in the direction of the first axial direction or second axial direction) by the thickness of the central portion 14. In addition, the crests 24 may lie in another plane and the valleys 26 may lie in yet another plane parallel to the plane in which the crests 24 lie. The planes are spaced apart by the height of the waves 20. In one embodiment, the height h1 of the waves may be 14 mm-17 mm. However, the present disclosure is not limited thereto, and the disc blade 10 may include waves having other suitable wave heights. In this embodiment, the central portion 14 presents a substantially planar profile. It is understood, however, the present invention is not limited to this configuration, and other suitable configurations are envisioned. For example, the wavy disc blade 10 may be formed as a substantially convex or concave unit, as described further below with reference to FIG. 5.

In an exemplary embodiment, the wavy portion 18, when viewed radially along its periphery, presents a wave pattern.

Thus, the crests 24 and valleys 26 on the first side 12 may be, on the second side 40, viewed as valleys and crests, respectively. Accordingly, on the second side 40, the valleys (i.e., the opposite side of the crests 24) extend from the central portion 14 to distal ends of respective teeth 28, and the crests (i.e., the opposite side of the valleys 26) extend from the central portion 14 to respective notches 36.

Figure 5:
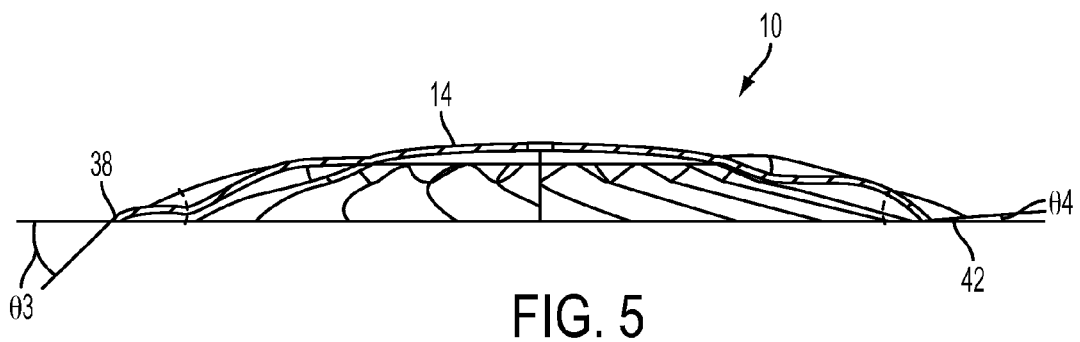
FIG. 5 is a cross-sectional view of the wavy disc blade according to another exemplary embodiment of the present invention.

FIG. 5 illustrates a cross-sectional view of the wavy disc blade 10 according to another exemplary embodiment of the present invention. In this exemplary embodiment, the disc blade 10 is formed generally as a concave disc. Referring to FIG. 5, the central portion 14 may be formed with a concavity, and thus, presents a concave profile on one side and a convex profile on the other side. Similarly, the wavy portion 18 extends from the central portion 14 along a similar concave/convex profile. In an exemplary embodiment, the first beveled portion 38 may extend at angle θ3 relative to a plane in which distal ends of the teeth 28 lie between 28 degrees and 32 degrees. The second beveled portion 42 may extend at an angle θ4 relative to the plane in which distal ends of the teeth lie between −2 degrees and 2 degrees. When viewed relative to an immediately adjacent portion of the wave crest 24 or valley 26, the first and second beveled portions may extend an angle similar to θ1 and θ2 described above.

It is understood that in the exemplary embodiments above the wavy disc blade 10 may be a homogenous, integral unit. Thus, the wavy portion 18 and central portion 14 may be formed integrally. Alternatively, the central portion 14 and wavy portion 18 may be formed separately and joined together with a suitable fastener(s).

In use, the disc blade 10 may be rotated in either a first direction such that the first engagement surface 30 is configured to impact a work surface to be tilled, or a second direction such that the second engagement surface 32 is configured to impact a work surface, depending on a particular application and desired output from the disc blade 10. The geometry of the disc blade 10, including, for example, the asymmetric teeth 28, first beveled portion 38, second beveled portion 42 and the wavy portion 18 which presents a wave pattern of crests 24 and valleys 26 may improve ground penetration of the disc blade 10 along with residue cutting ability. Additionally, as will be appreciated by those skilled in the art, the various engagement surfaces of teeth 28 and notches 36 are as described herein form sharp edges that improve residue cutting and sizing ability.

Figure 6:
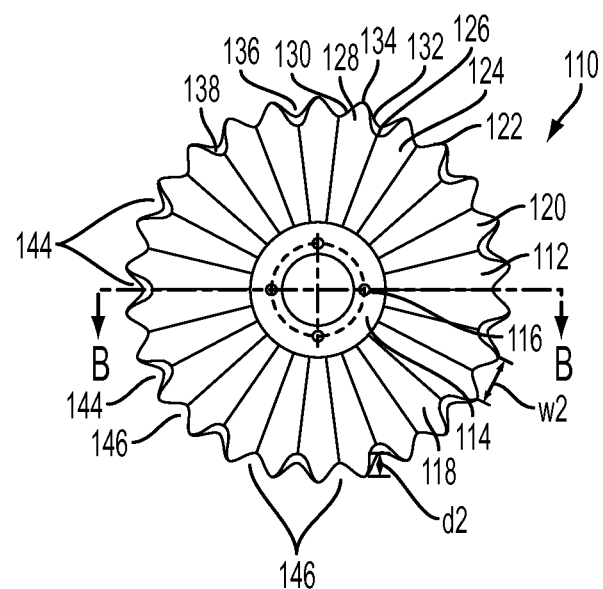
FIG. 6 is a front view showing a first side of a wavy disc blade according to yet another exemplary embodiment of the present invention.
Figure 7:
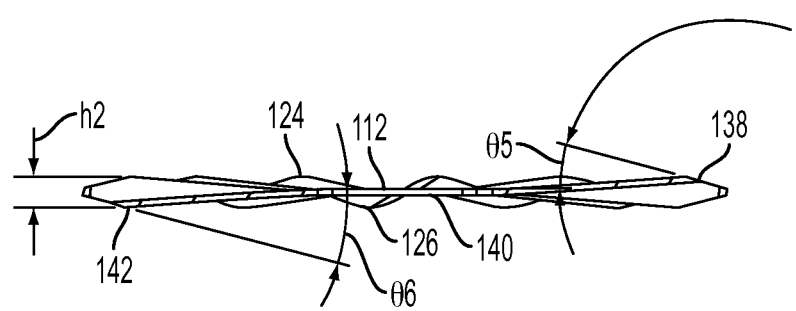
FIG. 7 is a cross-sectional view of the wavy disc blade of FIG. 6.

FIGS. 6 and 7 illustrate a wavy disc blade 110 according to another exemplary embodiment of the present invention. FIG. 6 is a front view illustrating a first side 112 of the wavy disc blade 110 according to an exemplary embodiment. Similar to the wavy disc blade 10 described in the exemplary embodiments above, the wavy disc blade 110 includes a central portion 114 having at least one opening 116 formed therein. The wavy disc blade 110 further includes a wavy portion 118 comprising a plurality of waves 120. The waves 120 extend radially outward from the central portion 114 to an edge portion 122. The waves 120 include a plurality of alternately positioned crests 124 and valleys 126.

On the first side 112, the crests 124 extend outward from the central portion 114 radially further than the valleys 126, thereby forming a plurality of radially extending teeth 128 along the edge portion 122. In an exemplary embodiment, individual teeth 128 are generally symmetric. Each tooth 128 may include a first engagement surface 130, a second engagement surface 132 and a third engagement surface 134. A peak of each tooth may be formed on the third engagement surface 134.

Notches 136 are alternately formed between adjacent teeth 128. A notch is bounded by a first engagement surface 130 of a first tooth 128 and a second engagement surface 132 of a second tooth 128 adjacent to the first tooth 128. In an exemplary embodiment, a notch 136 includes either a first beveled portion 138 formed on the first side 112 of the wavy disc blade 110 or a second beveled portion 142 formed on a second side 140 of the wavy disc blade 110, opposite to the first side 112. In addition, the teeth 128 may include beveled portions on the first side 112 and second side 140 of the wavy disc blade 110.

In an exemplary embodiment, the notches 136 include a first set of notches 144 and a second set of notches 146. The first set of notches 144 includes the first beveled portion 138 while the second set of notches 146 includes the second beveled portion 142. In an exemplary embodiment, the notches of the first set of notches 144 and notches of the second set of notches 146 are alternately positioned.

FIG. 7 illustrates a cross-section taken at B-B of FIG. 6. In an exemplary embodiment, the first beveled portion 138 may extend at an angle θ5 relative to a plane in which the wavy disc blade 110 lies of about 15 degrees. Similarly, the second beveled portion may also extend at angle θ6 of about 15 degrees relative to a plane in which the wavy disc blade 110 lies. The plane in which the wavy disc blade 110 lies may be a plane that bisects a wave pattern formed by the wavy portion 118, through the diameter of the disc blade 110.

The wavy disc blade 110 may include, for example, twenty six notches 136. More specifically, the disc blade 110 may include thirteen notches in the first set of notches 144 and thirteen notches in the second set of the notches 146. The notches 136 may have a depth d2 of, for example, about 22.9 mm (0.9 inches), and width w2 of, for example, about 59.2 mm (2.33 inches). The wave pattern of the wavy portion 118, measured from a crest 124 to a valley 126 may have a height h2 of, for example, 26.9 mm (1.06 inches). It is understood that these configurations are provided for the purposes of example, and variations in these dimensions are envisioned.

In the exemplary embodiments above, ground penetration and cutting ability of the wavy disc blade 110, e.g., the ability to cut and/or break residue, may be improved by, for example, the notches 136 having first and second beveled portions 138, 142.

Figure 8:
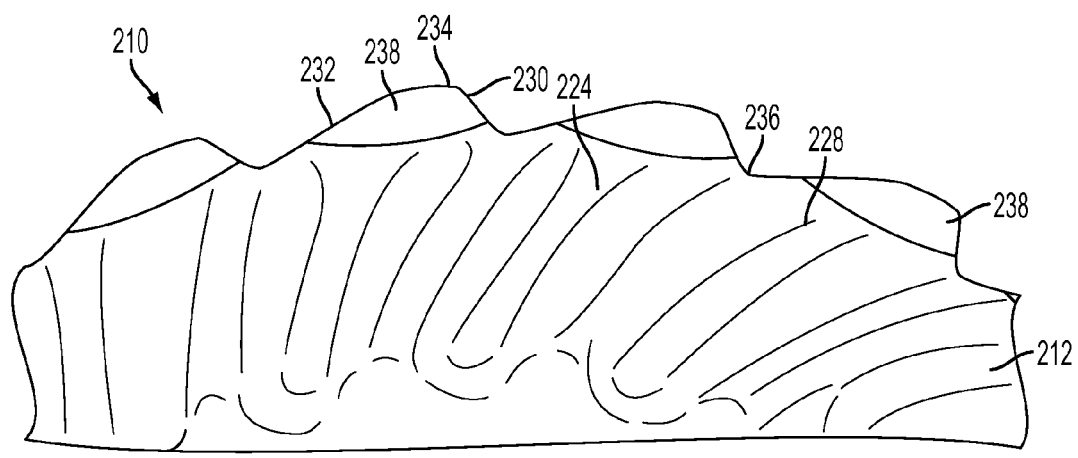
FIG. 8 is a partial view of a first side of a disc blade according to another embodiment.
Figure 9:
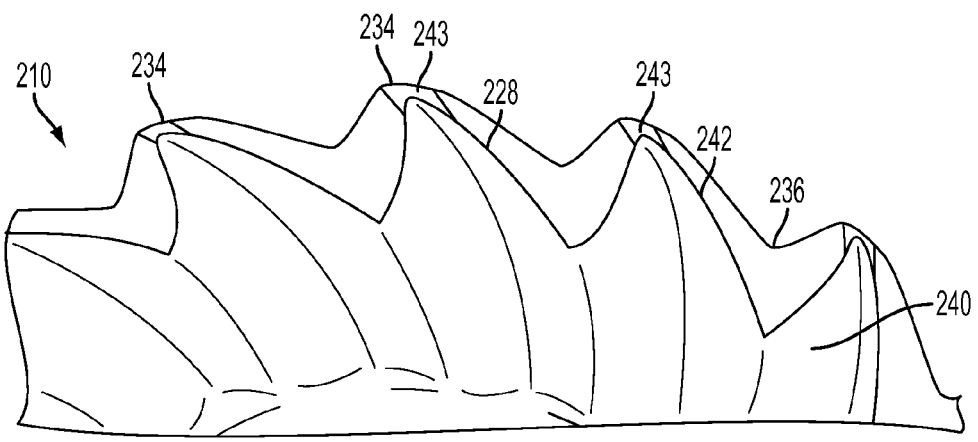
FIG. 9 is a partial view of a second side of the disc blade of FIG. 8.

FIGS. 8 and 9 are partial views of a disc blade 210 according to another embodiment described herein. The disc blade 210 of FIGS. 8 and 9 may be formed in generally the same manner as the disc blade 10 described in the embodiment above with reference to FIGS. 1-4. Accordingly, it is understood that further description of, or reference to the features described in the embodiments above may be omitted below. In addition, it is understood that features described in the embodiments above may be used together with features described in the embodiments below, and vice versa.

FIG. 8 is a partial view of a first side 212 of the disc blade 210. FIG. 9 is a partial view of a second side 240 of the disc blade 210. Referring to FIG. 8, the first beveled portion 238 may be discretely formed at each tooth 228 of the plurality of teeth. The first beveled portion 238 may extend from a radially inner portion of a tooth 228 to the first engagement surface 230, second engagement surface 232 and third engagement surface 234. In one embodiment, the first beveled portion 238 extends at an angle θ1 (see FIG. 4) of about 5 degrees to 20 degrees, and in a specific embodiment, about 16 degrees, relative to a plane in which the crests 224 of the waves lie.

Referring to FIG. 9, a second beveled portion 242 may be formed similarly to the second beveled portion 42 described above with reference to FIGS. 1-4. That is, the second beveled portion 242 may be formed continuously about the periphery of the disc blade 210 on the second side 240. The second beveled portion 242, in the region of the notches 236 may extend an angle θ2 (see FIG. 4) of about 5 degrees to 30 degrees, and in one embodiment, about 21 degrees. In one embodiment, the second beveled portion 242 is formed differently in a region 243 at the peak of each tooth 228 than at a notch 236. For example, at the second side 240, at a region 243 of tooth 228 extending to the third engagement surface 234, the second beveled portion 242 may extend an angle θ2 (see FIG. 4) of about 5 degrees to 20 degrees, and in one embodiment, about 16 degrees. The notch 236 has a depth of approximately 15 mm to 25 mm.

Figure 10:
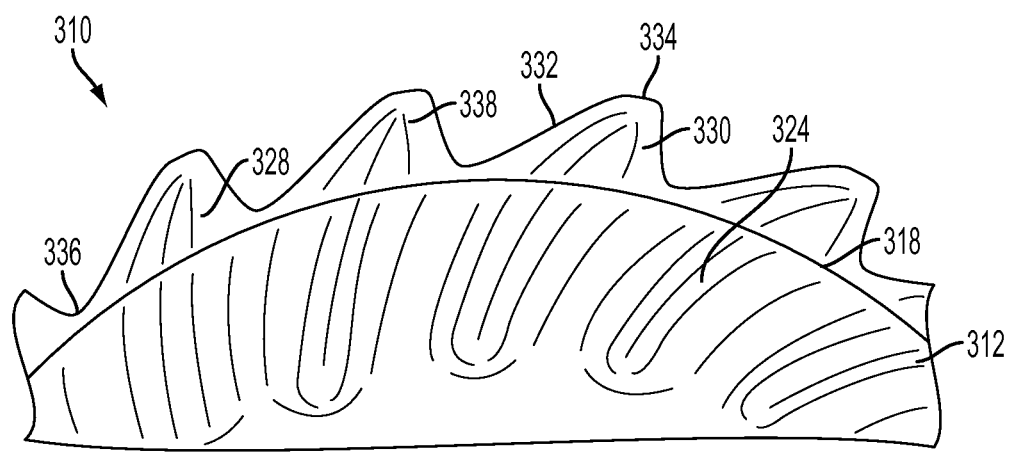
FIG. 10 is a partial view of a first side of a disc blade according to another embodiment.
Figure 11:
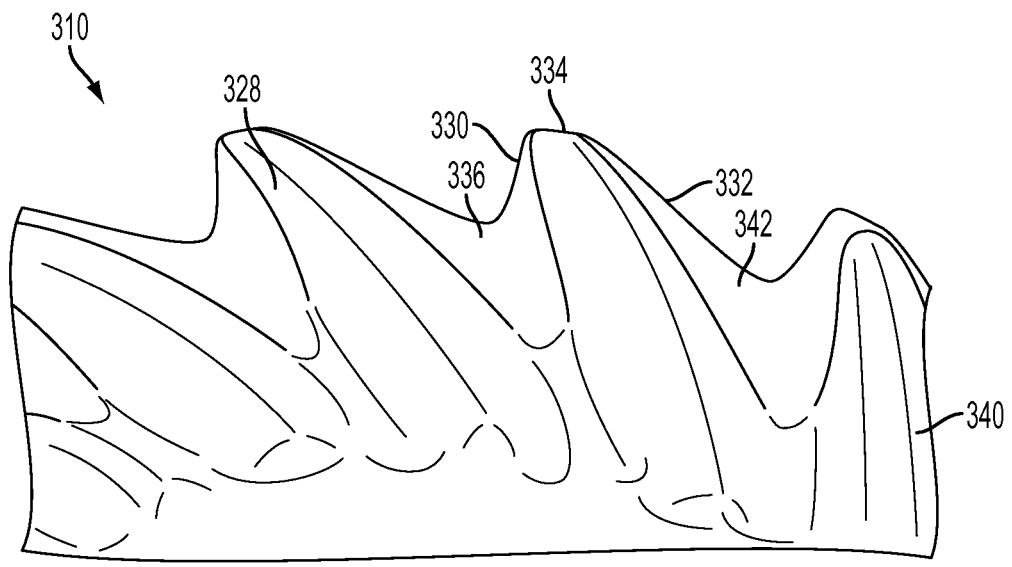
FIG. 11 is a partial view of a second side of the disc blade of FIG. 10.

FIGS. 10 and 11 are partial views of a disc blade 310 according to another embodiment described herein. The disc blade 310 of FIGS. 10 and 11 may be formed in generally the same manner as the disc blade 10 described in the embodiment above with reference to FIGS. 1-4. Accordingly, it is understood that further description of, or reference to the features described in the embodiments above may be omitted below. In addition, it is understood that features described in the embodiments above may be used together with features described in the embodiments below, and vice versa.

FIG. 10 is a partial view of a first side 312 of the disc blade 310. FIG. 11 is a partial view of a second side 340 of the disc blade 310. Referring to FIG. 10, the first beveled portion 338 may be continuously formed about the periphery of the disc blade 310, both at the teeth 328 and the notches 336. The first beveled portion 338 may extend from a radially inner portion of the wavy portion 318 to the first engagement surface 330, second engagement surface 332, third engagement surface 334 and notch 336. In one embodiment, the first beveled portion 338 extends at an angle θ1 (see FIG. 4) of about 5 degrees to 40 degrees, and in a specific embodiment, about 11 degrees, relative to a plane in which the crests 324 of the waves lie.

Referring to FIG. 11, a second beveled portion 342 may be formed along the first engagement surface 330, second engagement surface 332 and the notch 336. The second beveled portion 342 may extend an angle θ2 (see FIG. 4) of about 10 degrees to 30 degrees, and in one embodiment, about 28 degrees. In a region at the peak of each tooth 328, i.e., at the third engagement surface 334, the tooth may be angled about 9 degrees. The notch may be formed having a depth of 15 mm-25 mm, and in one embodiment, 19 mm.

It will be appreciated by those skilled in the art that exemplary embodiments of the wavy disc blade disclosed herein may provide for several advantages of prior art disc blades, particularly for vertical tillage applications. As known to those skilled in the art, one claimed advantage of vertical tillage is that vertical tillage devices can operate at shallower depths and at higher speeds than traditional tillage devices. At such shallower depths and higher speeds, the condition of the edge of the disc blade may restrict the disc blade's ability to cut and size residue. Therefore, a disc blade with a consistently sharp edge, as provided by the claimed disc blades, is advantageous for vertical tillage applications.

The claimed disc blades may also provide several additional advantages over prior art disc blades. First, by including beveled portions on both sides (i.e., front and back) of the disc blades, the claimed disc blades are better balanced so as to avoid the blades pulling to one side or another during use. Second, by alternating the beveled portions between notches, the longevity of the claimed disc blades may be advantageously improved. Third, the waves (or flutes or scallops) impart strength to the notches such that the notches are able to better withstand impacts with hard objects, such as rocks. Lastly, as the claimed disc blades wear with use, the notches retain the ability to cut residue, as noted above, thereby reducing the need to add weight to the tilling device (as is known in the prior art to cause prior art disc blades to engage with the soil as they wear).

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A wavy disc blade, comprising:
   a first side;
   a second side;
   a central portion having at least one opening formed therein;
   a wavy portion adjacent to, extending radially from and circumferentially about the central portion, the wavy portion having a plurality of waves extending from the central portion to an edge portion, the waves forming a plurality of crests and valleys between the central portion and the edge portion;
   a plurality of cutting teeth formed along the edge portion, each tooth of the plurality cutting teeth having a first engagement surface and a second engagement surface, the first engagement surface being shorter than the second engagement surface so that each tooth is asymmetrically shaped; and
   at least one of a first beveled portion on the first side at the edge portion and a second beveled portion on the second side at the edge portion.

2. The wavy disc blade of claim 1, wherein a notch is formed between adjacent teeth of the plurality of cutting teeth and the notch is bounded by the second engagement surface of one tooth and the first engagement surface of an adjacent tooth.

3. The wavy disc blade of claim 2, wherein each tooth of the plurality of cutting teeth includes a third engagement surface positioned between the first engagement surface and the second engagement surface, and a peak of each tooth is formed along the third engagement surface.

4. The wavy disc blade of claim 3, wherein on the first side, each crest of the plurality of crests extends to a peak of respective teeth of the plurality of cutting teeth, and each valley extends to a respective notch.

5. The wavy disc blade of claim 4, wherein the first beveled portion is formed by a portion of each tooth of the plurality of teeth on the first side angling toward the second side such that a thickness of the tooth decreases.

6. The wavy disc blade of claim 5, wherein the first beveled portion extends to the third engagement surface.

7. The wavy disc blade of claim 5, wherein the first beveled portion extends to the first engagement surface, the second engagement surface and the third engagement surface.

8. The wavy disc blade of claim 4, wherein the second beveled portion is formed by a portion of the second side angling toward the first side such that a thickness of the tooth decreases.

9. The wavy disc blade of claim 8, wherein the second beveled portion extends continuously about the edge portion.

10. The wavy disc blade of claim 8, wherein the second beveled portion extends along the notch, and adjacent second beveled portions are spaced apart by the third engagement surface.

11. The wavy disc blade of claim 1, wherein the central portion is substantially flat on the first side and the second side.

12. The wavy disc blade of claim 11, wherein the crests and valleys of the wavy portion lie substantially in two spaced apart planes.

13. The wavy disc blade of claim 1, wherein the central portion is concave.

14. The wavy disc blade of claim 13, wherein the wavy portion is concave in the same direction as the central circular portion.

15. The wavy disc blade of claim 1, wherein the waves of the wavy portion are curved in the circumferential direction.

16. The wavy disc blade of claim 1, wherein the at least one opening is a centrally positioned opening.

17. The wavy disc blade of claim 1, comprising both the first beveled portion on the first side and the second beveled portion on the second side extending at least partially along the edge portion.

18. A wavy disc blade, comprising:
a first side;
a second side;
a generally circular central portion having at least one opening formed therein;
a wavy portion adjacent to, extending radially from and circumferentially about the central portion, the wavy portion having a plurality of waves extending from the central portion to an edge portion, the waves forming a plurality of crests and valleys between the central portion and the edge portion;
a plurality of teeth formed along the edge portion; and
a plurality of notches formed along the edge portion, wherein notches of the plurality of notches are alternately positioned between teeth of the plurality of teeth, each notch of the plurality of notches having one of a first beveled portion formed on the first side of the disc blade or a second beveled portion formed on the second side of the disc blade.

19. The wavy disc blade of claim 18, wherein the plurality of notches comprises a first set of notches having the first beveled portion formed thereon and a second set of notches having the second beveled portion formed thereon, wherein the notches of the first set of notches are alternately positioned with the notches of the second set of notches about a circumference of the wavy disc blade.

20. The wavy disc blade of claim 18, wherein the plurality of teeth are formed by the plurality of crests extending radially beyond the plurality of valleys on the first side of the wavy disc blade.

* * * * *